June 5, 1951 S. C. STRIBLING, JR 2,556,119

SYSTEM FOR INDICATING PHASE RELATIONSHIP
BETWEEN TWO SOURCES OF ALTERNATING VOLTAGES

Filed Aug. 21, 1947

INVENTOR.
STILES C. STRIBLING, JR.

BY [signature]

ATTORNEY

Patented June 5, 1951

2,556,119

UNITED STATES PATENT OFFICE 2,556,119

SYSTEM FOR INDICATING PHASE RELATIONSHIP BETWEEN TWO SOURCES OF ALTERNATING VOLTAGE

Stiles C. Stribling, Jr., Moorestown, N. J., assignor to Radio Corporation of America, a corporation of Delaware Application August 21, 1947, Serial No. 769,771

7 Claims. (Cl. 172—245)

This invention relates to an indicating system, and particularly to a method of and apparatus for indicating an out-of-phase condition or voltage unbalance between two sources of radio frequency voltage feeding a common load.

The present invention is hereinafter described with particular reference to a frequency modulation type of transmitter in which the final power amplifier stage comprises two similar amplifier tubes having grounded-grid circuits and provided with individual tank circuits feeding a common load, such as an antenna. In such a transmitter, it is important in the interest of efficiency that there be minimum circulating current between the two power amplifier tubes of the same stage. The invention, however, is not limited to such a system and has other applications.

An object of the invention is to provide in a system of the foregoing type means for ascertaining the phase relation between radio frequency voltages at the outputs of the two amplifier tubes individually feeding a common load.

Another object of the invention is to facilitate tuning and to insure proper phasing between two tank circuits both of which supply output voltages to a common load over separate feed lines and to insure that both output voltages are equal.

A more detailed description of the invention follows in conjunction with a drawing, wherein.

Throughout the figures of the drawing the same parts are represented by the same reference numerals.

Figure 1:
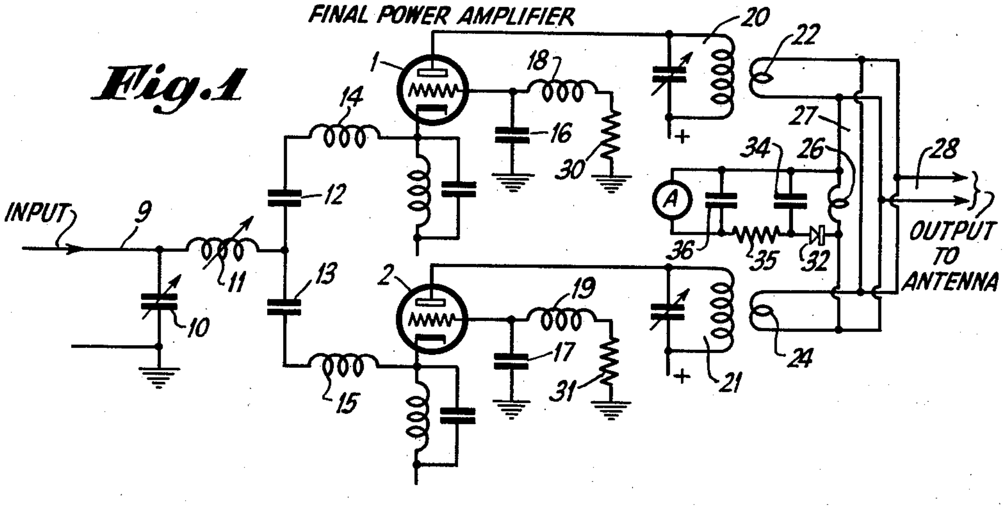
Fig. 1 illustrates, schematically, the indicator system of the invention applied to the final power amplifier stage of a radio transmitter.

Referring to Fig. 1, there is shown the final power amplifier stage of a radio frequency modulation transmitter. This stage comprises a pair of triode amplifier tubes 1 and 2 having similar characteristics and whose cathodes are driven over a filter (pi) network 10, 11, 14 and 15 from an input lead which extends to the output of a preceding amplifier stage. The pi network includes a variable capacitor 10 and a variable inductor 11. The inductances 14 and 15, in practice, represent the lead inductance to the two tubes. In effect, elements 10 and 11 provide an impedance matching circuit between the driving circuit 9 and the input circuits of the two tubes 1 and 2. Between the inductor 11 and the cathode circuits of the tubes 1 and 2 are provided blocking condensers 12 and 13. The cathodes of the two tubes 1 and 2 will thus be fed in parallel with the same radio frequency input.

The grids of the tubes 1 and 2 are grounded for radio frequency currents by means of bypass condensers 16 and 17, respectively, and are provided with radio frequency choke coils 18 and 19 and with grid biasing resistors 30 and 31, as shown.

In circuit with the anodes of the tubes 1 and 2 are separate tank circuits 20 and 21 which feed a common output transline 28 over individual couplings 22 and 24. The couplings 22 and 24 are connected to line 28 by transmission lines of equal and appreciable length for the frequency of operation. The line 28 extends to a common load circuit, such as an antena, not shown.

In order to assure proper phasing between the outputs of the tank circuits, there is bridged across couplings 22 and 24 the indicator system comprising a two-conductor line 27 at whose center is an inductance 26 shunted by a voltmeter arrangement consisting of a crystal rectifier 32, a radio frequency bypass condenser 34, a radio frequency filter 35, 36 and a meter A. It will thus be evident that the voltmeter circuit and the inductance 26 are symmetrically arranged relative to the tank circuits 20 and 21 and the common load line 28.

The operation of the invention will now be given. Let it be assumed that the radio frequency voltages from the two tank circuits 20 and 21 are equal in value. If there is any departure from exact phase between the output radio frequency voltages induced in couplings 22 and 24, there will be a circulating current flowing from one tank to the other through the lines which connect couplings 22 and 24 to the load line 28. Since any flow of radio frequency current through a transmission line is accompanied by phase shift along the line equal to the distance traveled in electrical degrees, and since the lines connecting couplings 22 and 24 to line 28 are appreciable portions of a wavelength, the radio frequency voltages appearing across the ends of circuit 27 are out-of-phase and current will flow through this line. This condition is indicated by the appearance of a radio frequency voltage across inductance 26 and an indication on the voltmeter associated with the radio frequency voltmeter circuit. When only current to the load is flowing through the lines connecting 22 and 24 to line 28, the voltages appearing at the ends of line 27 will be equal and in phase, since the lines are symmetrically arranged and the phase shift in load current will be equal in both halves of the circuit from the points of connection of line 27 to the common point of connection to line 28. Since the inductance 26 is located at the center of line 27, the charging current flowing into line 27 from each end is not indicated on the meter.

By differentially tuning tank circuits 20 and 21 in the proper direction until the reading of the meter A is zero, the outputs from the two tank circuits will be brought into exact phase, and the efficiency of the system increased.

If, however, the couplings from the tank circuits 20 and 21 to the common load are different, and different voltages are induced in couplings 22 and 24, a circulating current will flow even though the voltages are in phase. This will also be the case if there are differences in the characteristics of the amplifier tubes 20 and 21. Since the invention responds to any circulating current, the indication of output voltage unbalance makes possible the adjustment of the circuit for maximum efficiency.

Figures 2, 3:
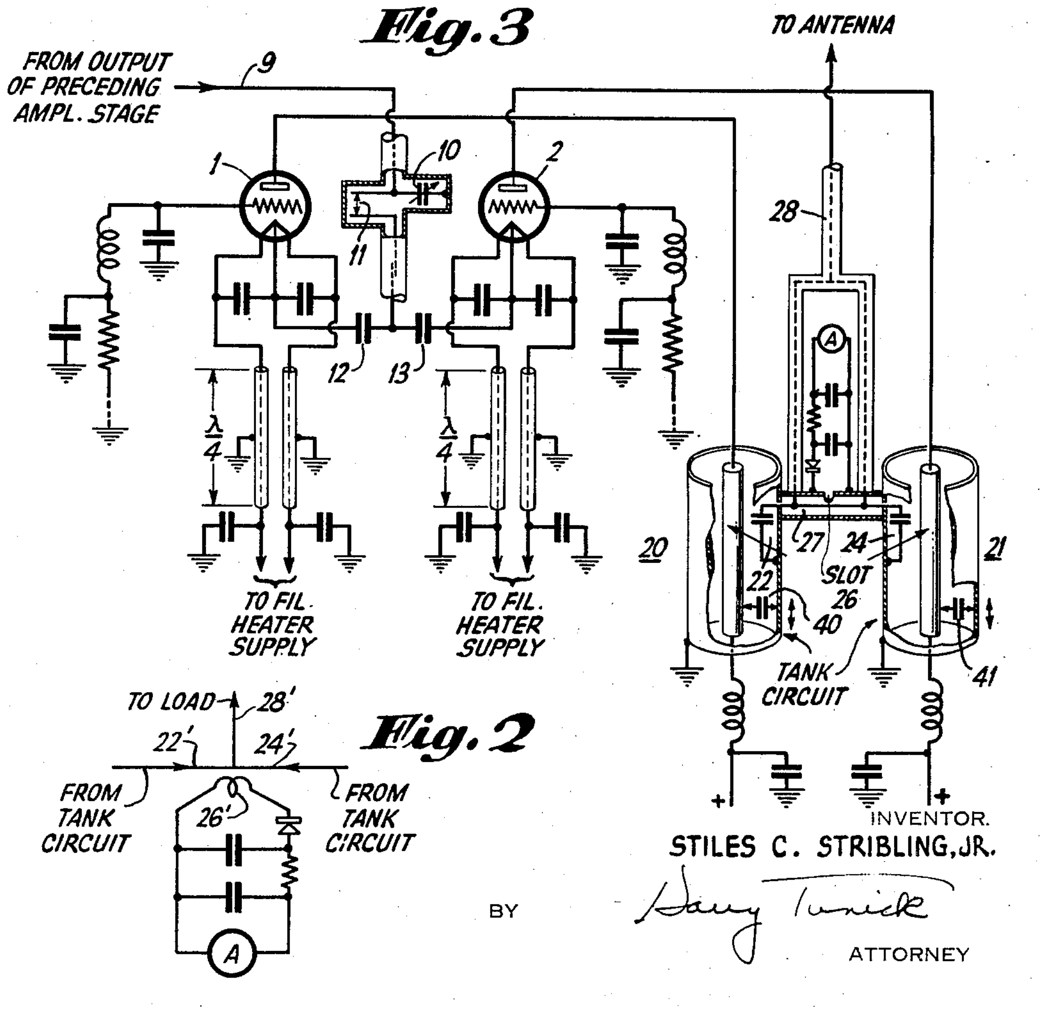
Fig. 2 illustrates a modification of the indicator system of the invention.
Fig. 3 illustrates in greater detail the physical layout of the system of Fig. 1.

Fig. 3 illustrates the physical layout of the system of Fig. 1 in one design for a 10 kw. frequency modulation transmitter operating in the frequency range of 88 megacycles to 108 megacycles. The tubes 1 and 2 are RCA type 7C24 tubes. The filament radio frequency chokes are quarter wavelength sections of coaxial lines. The amplifier output tank circuits are sections of concentric lines tuned by means of capacitor sliders 40 and 41 movable over the lengths of the tanks. The couplings 22 and 24 are loops having built-in capacitors and located between the inner and outer conductors of the concentric line tanks 20 and 21 respectively. The bridge circuit 27 and the connections to the common transmission line 28 feeding the load are coaxial lines. The inductance 26 is a transverse slot in the center of coaxial line 27, and the voltmeter circuit is coupled to symmetrical points on opposite sides of this slot intermediate the ends thereof. Inasmuch as any current flowing in line 27 will flow around the slot 26, it will be evident that the slot acts, in effect, as an inductance.

The coupling loops 22 and 24 in Fig. 3, between the individual tanks and the output coaxial lines are identical and symmetrically arranged so as to provide substantially equal coupling to the load, as far as possible.

Fig. 2 shows another embodiment of the invention, and illustrates only so much of the indicator system as is necessary for an understanding of the operation of the circuit. The outputs from the two tank circuits of the grounded-grid amplifier tubes of the final power amplifier stage are fed over lines 22′ and 24′ to the common output line 28′. The pick-up inductance 26′ is symmetrically located relative to the T or junction of lines 22′, 24′ and 28′ such that the current indicated by the voltmeter is due only to the tank-to-tank circulating current and not due to components of current which add and flow to the load.

In Fig. 2, the current is measured differentially at the junction of the two lines 22′ and 24′ which feed the common load. In practice, the inductance 26′ may be a slot placed in the outer conductor directly opposite the T on the inner conductor at the junction of the two coaxial lines 22′ and 24′.

The degree of coupling between the tanks 20 and 21 and the coupling loops 22 and 24 may be varied by means of reversible motors. Similarly, the tuning of the tanks may be effected by reversible motors linked to the tuning sliders 40 and 41. The use of reversible motors enables either a differential or an in-phase adjustment of the elements controlled thereby.

What is claimed is:

1. In combination, a pair of amplifier circuits operating at the same frequency and having separate tunable output tank circuits, a common load, a common feeder line for said load, individual means coupling said tank circuits to said common feeder line in electrically parallel relationship, a connection between said individual couplings so arranged as to permit current flow therebetween in the presence of any difference in phase or magnitude of the outputs of said tank circuits, means in said connection for causing a voltage to be developed thereacross whenever current flows in said connection, and a meter connected across said means for indicating the flow of current in said connection.

2. In combination, a pair of amplifiers, a common input circuit feeding said amplifiers in parallel with radio frequency excitation, separate tunable tank circuits for said amplifiers, a common output coaxial transmission line, individual coaxial lines coupling said tank circuits to said common output line in parallel, a coaxial line bridging said individual coaxial lines at a location adjacent said tank circuits, a slot arranged transversely in the outer conductor of said bridging coaxial line, and an indicator circuit connected across said slot.

3. In combination, a pair of amplifiers, a common input circuit feeding said amplifiers in parallel with radio frequency excitation, separate tunable tank circuits for said amplifiers, a common output coaxial transmission line, individual coaxial lines coupling said tank circuits to said common output line in parallel, a coaxial line bridging said individual coaxial lines at locations adjacent said tank circuits, a slot arranged transversely in the outer conductor of said bridging coaxial line at a location which is physically and electrically symmetrical with respect to said tank circuits, and a voltmeter circuit connected across said slot intermediate the ends thereof.

4. In combination, a pair of grounded-grid amplifier tubes each including a cathode and an anode, a source of radio frequency excitation coupled to the cathodes of both of said tubes, individual concentric line resonators for said amplifier tubes coupled to the anodes thereof, a coupling loop for each resonator, a common output transmission line, a coaxial line coupling each loop to said common output line, another coaxial line connecting said loops together, a transverse slot in the outer conductor of said last coaxial line, and a voltmeter circuit connected across said slot for indicating the circulating current in said last coaxial line.

5. In combination, a pair of grounded-grid amplifier tubes each including a cathode and an anode, a source of radio frequency excitation coupled to the cathodes of both of said tubes, individual concentric line resonators for said amplifier tubes coupled to the anodes thereof, tuning sliders for said resonators, a coupling loop for each resonator, means for adjusting the degree of coupling of each loop to its associated resonator, a common output transmission line, a coaxial line coupling each loop to said common output line, another coaxial line connecting said loops together, a transverse slot in the outer conductor of said last coaxial line, and a voltmeter circuit connected across said slot for indicating the circulating current in said last coaxial line.

6. In combination, a pair of grounded-grid amplifier tubes each including a cathode and an anode, a source of radio frequency excitation coupled to the cathodes of both of said tubes, individual concentric line resonators for said amplifier tubes coupled to the anodes thereof, a coupling loop for each resonator, a common output transmission line, a coaxial line coupling each loop to said common output line, a transverse slot in the outer conductor of said coaxial lines at the junction with said output line, said slot being symmetrically located with respect to said output line, and a voltmeter bridged across said slot at points intermediate the ends of the long dimension of said slot.

7. In combination in an electrical system, a pair of amplifier circuits operating at the same frequency and having separate tunable output tank circuits, a common load, said amplifier circuits being the last stages in said system feeding said load, a common feeder line for said load, individual couplings from said tank circuits to said common feeder line and feeding said line in parallel, and a voltmeter circuit symmetrically coupled to said couplings at the junction with said common feeder line but on opposite sides of said junction, and so arranged as to enable the flow of current between said couplings in the presence of any difference in phase or magnitude of the outputs of said tank circuits, whereby the voltmeter circuit indicates circulating current between tank circuits but not current which add and flow to said load.

STILES C. STRIBLING, Jr.

REFERENCES CITED

The following references are of record in the file of this patent:

UNITED STATES PATENTS

| Number | Name | Date |
|---|---|---|
| 1,979,668 | Boddie | Nov. 6, 1934 |
| 2,084,836 | Buschbeck | June 22, 1937 |
| 2,169,305 | Tunick | Aug. 15, 1939 |
| 2,368,694 | Watts | Feb. 6, 1945 |